US009873401B2

(12) United States Patent
Low et al.

(10) Patent No.: US 9,873,401 B2
(45) Date of Patent: Jan. 23, 2018

(54) AIRBAG FABRIC INCLUDING APERTURES AND METHODS OF FORMING THE SAME

(71) Applicant: Autoliv ASP, Inc., Ogden, UT (US)

(72) Inventors: Jeffrey Eugene Low, Layton, UT (US); Charles Richards, Farmington, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 15/055,068

(22) Filed: Feb. 26, 2016

(65) Prior Publication Data

US 2017/0247012 A1    Aug. 31, 2017

(51) Int. Cl.
| | | |
|---|---|---|
| *B60R 21/235* | (2006.01) | |
| *D03C 3/00* | (2006.01) | |
| *D03D 1/02* | (2006.01) | |

(52) U.S. Cl.
CPC .............. *B60R 21/235* (2013.01); *D03C 3/00* (2013.01); *D03D 1/02* (2013.01); *B60R 2021/23509* (2013.01); *B60R 2021/23547* (2013.01)

(58) Field of Classification Search
CPC ........ B60R 21/235; B60R 2021/23547; B60R 2021/23509; D03C 3/00; D03D 1/02; D03D 3/00; D03D 11/02
See application file for complete search history.

(56) References Cited

U.S. PATENT DOCUMENTS

| | | | | |
|---|---|---|---|---|
| 5,441,798 A | * | 8/1995 | Nishimura ........... | B01D 39/083 139/384 R |
| 5,651,395 A | * | 7/1997 | Graham ................. | B60R 21/23 139/390 |
| 5,768,875 A | | 6/1998 | Bergen | |
| 6,170,860 B1 | * | 1/2001 | Denz ................. | B60R 21/23138 280/729 |
| 6,734,125 B2 | * | 5/2004 | Veiga ..................... | D06N 3/183 139/384 R |
| 6,742,805 B2 | * | 6/2004 | Hill ....................... | B60R 21/235 280/730.2 |
| 7,690,401 B2 | * | 4/2010 | Okuno .................. | B60R 21/235 139/384 R |
| 8,608,191 B2 | * | 12/2013 | Dainese .............. | A41D 13/018 280/730.1 |
| 8,622,424 B2 | * | 1/2014 | Finn .................... | B60R 21/2338 280/743.1 |
| 9,085,834 B2 | * | 7/2015 | Huber ..................... | D03D 1/02 |
| 9,283,922 B2 | * | 3/2016 | Fischer .............. | B60R 21/2334 |
| 2005/0082807 A1 | | 4/2005 | Kwon | |

(Continued)

FOREIGN PATENT DOCUMENTS

| | | |
|---|---|---|
| DE | 19843456 A1 | 4/1999 |
| DE | 20015134 U1 | 1/2001 |

(Continued)

*Primary Examiner* — Paul N Dickson
*Assistant Examiner* — Timothy Wilhelm
(74) *Attorney, Agent, or Firm* — Stoel Rives LLP

(57) ABSTRACT

Fabrics for inflatable airbags including one or more aperture sections are disclosed. The aperture sections can be formed in woven fabric panels of the inflatable airbags. Methods of weaving fabric panels including aperture sections for inflatable airbags are also disclosed. The aperture sections may define vents, or the aperture sections may receive a portion of an inflator, a lead wire, and/or a mounting hardware component.

21 Claims, 12 Drawing Sheets

(56) References Cited

U.S. PATENT DOCUMENTS

| | | | |
|---|---|---|---|
| 2007/0200329 A1 | 8/2007 | Ma | |
| 2008/0042413 A1* | 2/2008 | Coleman | D03D 1/02 |
| | | | 280/743.1 |
| 2010/0173137 A1* | 7/2010 | Kismir | B26D 5/007 |
| | | | 428/196 |
| 2010/0253047 A1* | 10/2010 | Youn | B60R 21/235 |
| | | | 280/728.1 |
| 2015/0367807 A1* | 12/2015 | Becker | B60R 21/23 |
| | | | 280/743.1 |

FOREIGN PATENT DOCUMENTS

| | | |
|---|---|---|
| EP | 2407353 A1 | 1/2012 |
| GB | 2316370 A | 2/1998 |
| WO | 2001044547 A2 | 6/2001 |

\* cited by examiner

AIRBAG FABRIC INCLUDING APERTURES AND METHODS OF FORMING THE SAME

BACKGROUND

Inflatable airbags may be mounted within a vehicle and deploy during a collision event. The deployed airbag may cushion an occupant and prevent detrimental impact with other vehicular structures. Some airbags suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
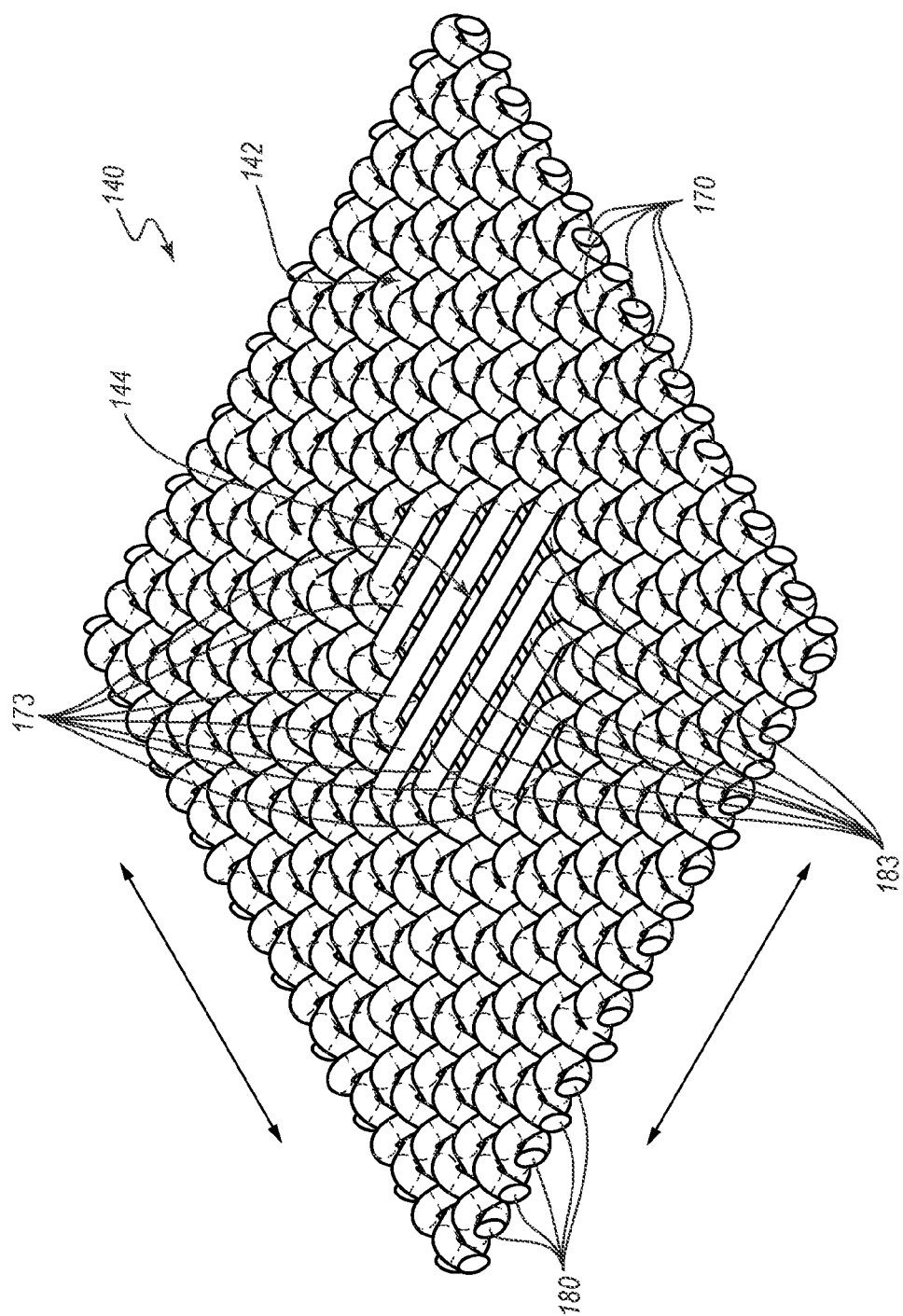
FIG. 1 is a perspective view of a portion of a fabric panel for an inflatable airbag according to one embodiment of the present disclosure.

As can be readily understood, the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical and fluid interaction. Two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

Inflatable airbag systems are widely used to reduce or minimize vehicle occupant injury during collision events. Airbag modules have been installed at various locations within a vehicle, including, but not limited to, within the steering wheel, within the dashboard and/or instrument panel, within the side doors or side seats, adjacent to a roof rail of the vehicle, in an overhead position, or at the knee or leg position. In the following disclosure, "airbag" generally refers to an inflatable airbag or an inflatable cushion (e.g., curtain airbags, driver airbags, and knee airbags).

In a collision event, an inflatable airbag may be inflated by an inflator and change conformation from being rolled and/or folded in the packaged state to being extended and/or inflated in the deployed state. In some arrangements, the amount of gas from the inflator that is retained within the inflatable airbag determines how hard or soft the cushioning of the airbag will be or how hard or soft portions of the airbag will be. Other factors may also affect the cushioning abilities of the inflatable airbag.

Some inflatable airbags may be configured to serve dual functions of cushioning and ejection prevention. During a collision event, for example, a curtain airbag may cushion the head and upper body of an occupant, and during a roll-over event, the curtain airbag may function to help retain the occupant within the vehicle. Inflatable curtain airbags may help mitigate the risk of occupant ejection by forming a barrier between the occupant and the side windows.

Some inflatable airbags have a throat portion that is in fluid communication with an inflator. The inflator may be configured to generate inflation gas in response to predetermined conditions. The inflatable airbag may include one or more voids or chambers for receiving the inflation gas.

In some embodiments, the inflatable airbag may be configured such that the inflation gas is delivered or guided in a controlled or delayed manner from the inflator into one or more chambers or segments of the airbag. Such controlled or delayed direction of the inflation gas into the inflatable airbag chambers or segments may soften the deployment of the inflatable airbag and/or the cushioning provided by the deployed inflatable airbag. Inflatable airbags with varying timing of inflation of different portions or segments of the airbag may be desirable. Likewise, inflatable curtain airbags with varying levels of hardness in different portions or segments of the airbag during deployment and/or upon deployment may also be desirable.

As discussed above, an inflatable airbag can include an inflator, which may be positioned within and/or coupled to a throat portion of the inflatable airbag. The inflator can include any typical inflator device, including either a pyrotechnic device or a stored gas inflator. The inflator may also include a single-stage inflator or a multiple-stage inflator. In certain embodiments, the inflator can be in electronic communication with vehicle sensors which are configured to detect vehicle collisions and/or rollovers. Upon detection of predetermined conditions, the sensors can activate the inflator, and the inflatable airbag may be inflated or rapidly inflated. Other configurations of the inflator are also within the scope of this disclosure.

In various embodiments, at least a portion of an inflatable chamber and/or a non-inflatable portion can be defined by one or more boundary seams. The one or more boundary seams may be formed in any suitable manner. For example, as discussed in more detail below, the boundary seams may be woven portions that are formed via one-piece weaving (OPW) techniques. In other or further embodiments, the one or more boundary seams may include one or more of stitches, welds (e.g., radiofrequency welds), and/or adhesives. In some embodiments, the boundary seams may join together two or more pieces of fabric, such as a front face and a rear face. In some embodiments, the one or more boundary seams are substantially airtight so as to be able to retain inflation gas within a given inflatable chamber. The one or more boundary seams can be said to fluidly isolate adjacent inflatable chambers from each other. In other embodiments, the one or more boundary seams may not be airtight, but may instead resist egress of gases from an inflatable chamber.

As used herein, the terms "aperture" and "aperture section" refer to a gap in a weaving pattern (e.g., an alteration of a typical weaving pattern). An aperture may be an opening, but the aperture is not limited to an opening. An aperture may refer to a break or a gap in a weaving pattern that allows or permits ingress or egress of an object, a gas, etc., through at least a portion of a woven fabric panel.

FIG. 1 depicts a portion of a fabric panel 140 for an airbag (e.g., an inflatable airbag). As illustrated, the fabric panel 140 includes a woven section 142 including a plurality of first yarns 170. The woven section 142 also includes a plurality of second yarns 180 that are oriented transverse to, or substantially transverse to, the plurality of first yarns 170. In some embodiments, the first yarns may include warp yarns and the second yarns may include weft yarns. In some other embodiments, the first yarns may include weft yarns and the second yarns may include warp yarns. Furthermore, each yarn of the plurality of first yarns 170 and each yarn of the plurality of second yarns 180 may include one or more threads. For example, a plurality of threads may be coupled or disposed together to form a yarn. As depicted, the plurality of first yarns 170 is interwoven with the plurality of second yarns 180 to form at least a portion of the woven section 142.

The fabric panel 140 can also include one or more apertures or aperture sections 144. At least a portion of the aperture section 144 can be surrounded by at least a portion of the woven section 142. The aperture section 144, as depicted, includes a first set of multiple adjacent yarns 173 of the plurality of first yarns 170. Additionally, the aperture section 144 includes a second set of multiple adjacent yarns 183 of the plurality of second yarns 180. At the aperture section 144, the first set of multiple adjacent yarns 173 extends over the second set of multiple adjacent yarns 183 such that the second set of multiple adjacent yarns 183 extends under the first set of multiple adjacent yarns 173. In some embodiments, at the aperture section 144, the complete first set of multiple adjacent yarns 173 may extend over the complete second set of multiple adjacent yarns 183 such that the complete second set of multiple adjacent yarns 183 extends under the complete first set of multiple adjacent yarns 173.

As illustrated, the first set of multiple adjacent yarns 173 of the plurality of first yarns 170 includes seven individual or separate yarns. Likewise, the second set of multiple adjacent yarns 183 of the plurality of second yarns 180 includes seven individual yarns. In some embodiments, the first set of multiple adjacent yarns 173 of the plurality of first yarns 170 may comprise more individual yarns than the second set of multiple adjacent yarns 183 of the plurality of second yarns 180. In some other embodiments, the first set of multiple adjacent yarns 173 of the plurality of first yarns 170 may comprise fewer individual yarns than the second set of multiple adjacent yarns 183 of the plurality of second yarns 180. Stated another way, the number of individual yarns in the first set of multiple adjacent yarns 173 of the plurality of first yarns 170 may be different from the number of individual yarns in the second set of multiple adjacent yarns 183 of the plurality of second yarns 180. In certain embodiments, the first set of multiple adjacent yarns 173 may include 1, 2, 3, 4, 5, 6, 7, 8, 9, 10, 15, 20, 30, 40, 50, 75, 100, or another suitable number of individual yarns. In various embodiments, the second set of multiple adjacent yarns 183 may include 1, 2, 3, 4, 5, 6, 7, 8, 9, 10, 15, 20, 30, 40, 50, 75, 100, or another suitable number of individual yarns.

In some embodiments, the first set of multiple adjacent yarns 173 of the plurality of first yarns 170 and/or the second set of multiple adjacent yarns 183 of the plurality of second yarns 180 may be selected to form a predetermined shape of the aperture section 144. The aperture section 144 may be sized and/or shaped to provide passage for a component (i.e., an airbag component), a gas, or another object through at least a portion of the fabric panel 140. For example, the aperture section 144 may be sized to allow a portion of an inflator (e.g., an inflator stud) to be disposed through a portion of the fabric panel 140. As can be appreciated, the size and/or shape of the aperture section 144 may vary. For example, the size and/or shape of the aperture section 144 may vary depending on the size and/or shape of the component that is to be disposed through the fabric panel 140. In another example, the size and/or shape of the aperture section 144 (e.g., an aperture section 144 forming a vent) may vary depending on a desired rate of flow of an inflation gas out of a chamber of an airbag including an aperture section 144. In various embodiments, the aperture section 144 may be substantially circular, substantially rectangular, substantially square, or substantially triangular. Any other suitable shape can also be used. For example, the shape of the aperture section 144 can be irregular (i.e., not a traditionally defined shape).

In some embodiments, each of the woven section 142 and the aperture section 144 may be integrally formed by a single weaving process (or the same weaving process). In certain embodiments, each of the woven section 142 and the aperture section 144 may be integrally formed by an OPW process.

Figure 2:
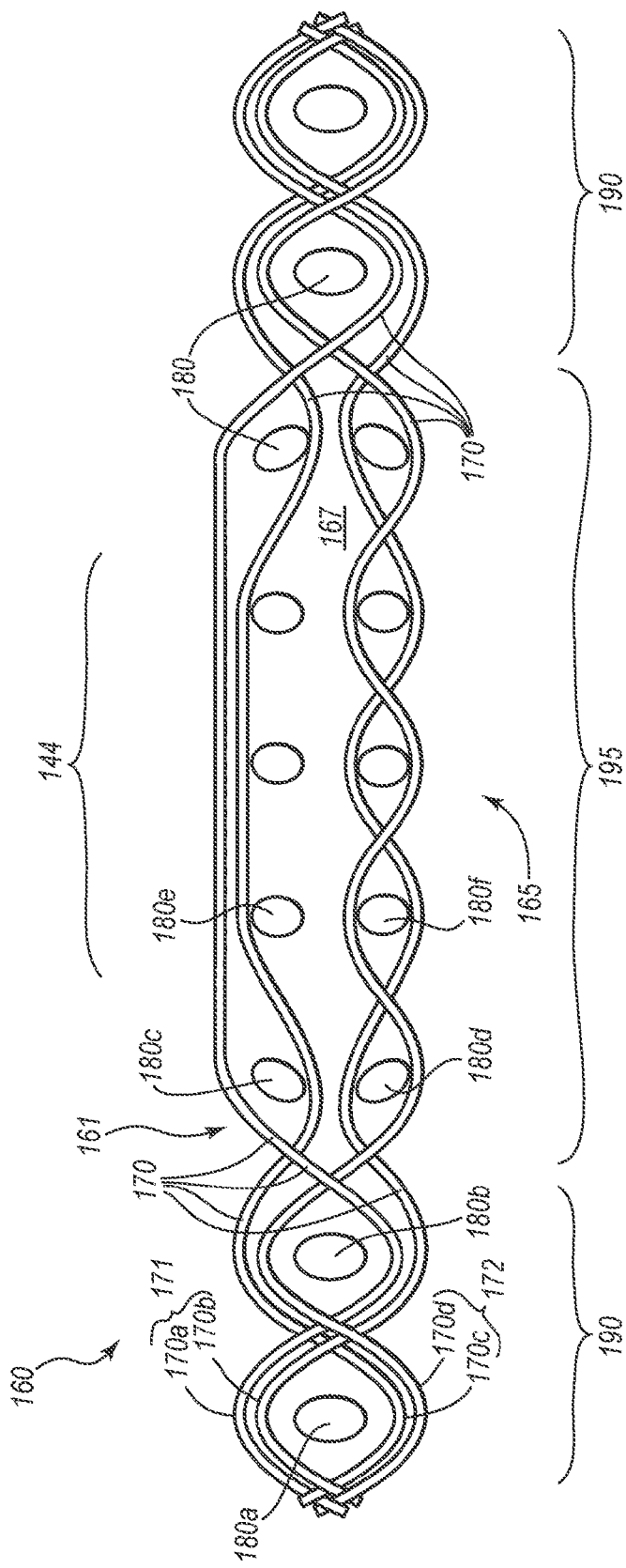
FIG. 2 is a side cross-section view of a woven airbag fabric according to one embodiment of the present disclosure.

FIG. 2 is a side cross-section view of a woven airbag fabric 160. A plurality of first yarns 170 (warp or weft) may be interwoven with a plurality of second yarns 180 (warp or weft). As illustrated, the plurality of first yarns 170 may include four sets of first yarns 170a, 170b, 170c, 170d; including first and second pairs 171, 172 of first yarn sets. Although first yarns 170 are shown as single threads, each thread may represent a plurality of first yarns that include a first yarn set. In the actual weaving process of the airbag fabric 160, an entire first yarn set may be positioned in like manner to its corresponding single first yarn as depicted. Consequently, the four first yarns 170a, 170b, 170c, 170d displayed in FIG. 2 can represent four sets of first yarns 170.

In some embodiments, the first pair 171 of first yarn sets may include first and second sets 170a, 170b of first yarns. The second pair 172 of first yarn sets may include third and fourth sets 170c, 170d of first yarns. The airbag fabric 160 can be woven by creating two types of fabric portions, a non-inflatable fabric portion 190 and an inflatable fabric portion 195. When the inflatable fabric portion 195 is woven, the first and second pairs 171, 172 of first yarn sets may alternately correspond to, respectively, first and third sets 170a, 170c of first yarns and second and fourth sets 170b, 170d of first yarns, as will be described hereafter.

The non-inflatable fabric portion 190 and the inflatable fabric portion 195 are woven from the same plurality of first yarns 170 and second yarns 180, forming an integral airbag fabric 160 using an OPW technique. The non-inflatable fabric portion 190 is thus woven with first and second first yarn sets 170a, 170b woven over a first adjacent second yarn 180a while third and fourth first yarn sets 170c, 170d are woven under the first adjacent second yarn 180a. Further, the first and second first yarn sets 170a, 170b are woven under a second adjacent second yarn 180b while third and fourth first yarn sets 170c, 170d are woven over the second adjacent second yarn 180b. This manner of weaving produces a weaving pattern, which may be repeated to form a desired length of a non-inflatable fabric portion 190.

Other ways of weaving first yarn sets 170a, 170b, 170c, 170d may also create a non-inflatable fabric portion 190, such as by weaving one set of first yarns over a first adjacent second yarn 180a while weaving the other three sets of first yarns (or the remainder of the four sets of first yarns) under the first adjacent second yarn 180a. Weaving first yarn sets around a second adjacent second yarn 180b could follow the one/three split of first yarn sets, or change back to weaving first and second pairs 171, 172 of first yarn sets on either side of subsequent second yarns 180. Furthermore, more than four first yarn sets may be used. Consequently, there are multiple ways to weave the non-inflatable fabric portion 190, which may result in an integral, single piece of woven fabric.

The inflatable fabric portion 195 may be woven from the same plurality of first yarns 170 and second yarns 180 as used to weave the non-inflatable fabric portion 190. That is, first first yarn set 170a can be woven over a first adjacent second yarn 180c while third first yarn set 170c is woven under the first adjacent second yarn 180c. Further, first first yarn set 170a may be woven under a second adjacent second yarn (not shown) while third first yarn set 170c may be woven over the second adjacent second yarn. Additionally, second first yarn set 170b may be woven over a third adjacent second yarn 180d while fourth first yarn set 170d is woven under the third adjacent second yarn 180d. Further, second first yarn set 170b may be woven under a fourth adjacent second yarn 180f while fourth first yarn set 170d is woven over the fourth adjacent second yarn 180f. This manner of weaving produces a weaving pattern, which may be repeated to form a desired length of an inflatable fabric portion 195.

The first and third first yarn sets 170a, 170c may be alternately woven around adjacent second yarns (e.g., adjacent second yarn 180c) to form a first woven fabric layer 161. Likewise, the second and fourth first yarn sets 170b, 170d may be alternately woven around additional adjacent second yarns (e.g., 180d, 180f) to form an opposing, second woven fabric layer 165. The weaving of first and second opposing, woven fabric layers 161, 165 may occur in parallel and concurrently for efficiency (i.e., during an OPW process). To make an inflatable fabric portion 195 of desired length, the weaving of first and second opposing, woven fabric layers 161, 165 is repeated until the desired length is obtained. After the inflatable fabric portion 195 is woven in the OPW process, weaving can transition to again form only a non-inflatable fabric portion 190, as described above, thereby forming at least one inflatable space or cell 167 between the first and second opposing, woven fabric layers 161, 165 and the non-inflatable fabric portion(s) 190.

The woven airbag fabric 160 may also include one or more aperture sections 144. In some embodiments, the one or more aperture sections 144 may be disposed in the first woven fabric layer 161 or the second woven fabric layer 165. In various embodiments, aperture sections 144 may be disposed in each of the first woven fabric layer 161 and the second woven fabric layer 165. Formation of the one or more aperture sections 144 is described in more detail below.

In some embodiments, the airbag fabric 160 may not require sewing of seams to seal the inflatable space 167. As the OPW process progresses, a plurality of varying shapes and sizes of inflatable spaces 167 may be formed in the fabric 160 having first and second pairs 171, 172 of first yarn sets. These inflatable spaces 167 may be created by the non-inflatable fabric portion 190 partitioning different areas of the inflatable fabric portion 195 through the use of a weaving pattern.

Figure 3:
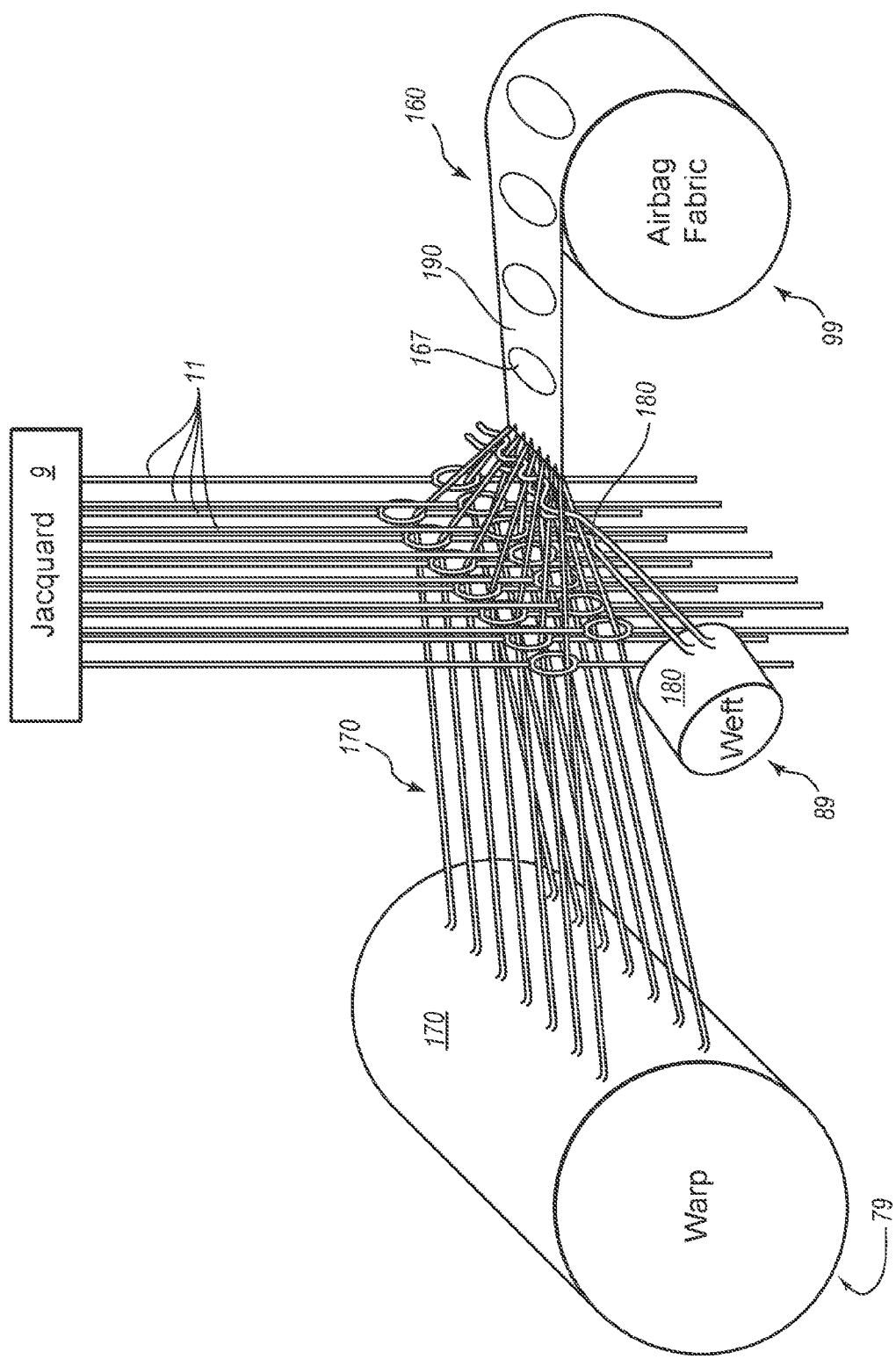
FIG. 3 is a perspective view of a Jacquard loom and one embodiment of weaving an airbag fabric.

FIG. 3 is a perspective view of one embodiment of weaving airbag fabric 160 with a loom, such as a Jacquard loom 9, having a plurality of lifting bars 11. Warp yarn sets 170 are spun from at least one warp yarn spool 79, although multiple warp yarn spools 79 may be used—for example, one warp yarn spool 79 each for warp yarn set pairs 171, 172 (see FIG. 2). Warp yarns 170 can be fed into lifting bars 11 of Jacquard loom 9. As each set of warp yarns 170 is lifted as directed by a computer, punch card, or other suitable mechanism (not shown), a weft yarn spool 89 inserts or picks at least one weft yarn 180 through the warp yarn sets 170. Weights (not shown) may be used to batten, or press home, the weft yarns 180 into woven fabric 160, which can exit onto a fabric spool 99. The alternation of the warp yarns 170 and weft yarns 180 to produce airbag fabric 160 was explained briefly in reference to FIG. 2. Note that airbag fabric 160, as shown, can include alternating patterns of non-inflatable fabric portions 190 and inflatable cells 167, which may be used to produce an airbag.

FIGS. 4A-4F show cross-section views of a woven fabric 260 that can resemble the airbag fabric 160 described above in certain respects. Accordingly, like features are designated with like reference numerals, with the leading digits incremented to "2." Relevant disclosure set forth above regarding similarly identified features thus may not be repeated hereafter. Moreover, specific features of the airbag fabric 260 may not be shown or identified by a reference numeral in the drawings or specifically discussed in the written description that follows. However, such features may be the same, or substantially the same, as features depicted in other embodiments and/or described with respect to such embodiments. Accordingly, the relevant descriptions of such features apply equally to the features of the airbag fabric 260. Any suitable combination of the features and variations of the same described with respect to the airbag fabric 160 can be employed with the airbag fabric 260, and vice versa. This pattern of disclosure applies equally to further embodiments depicted in subsequent figures and described hereafter, wherein the leading digits may be further incremented.

Figure 4A:
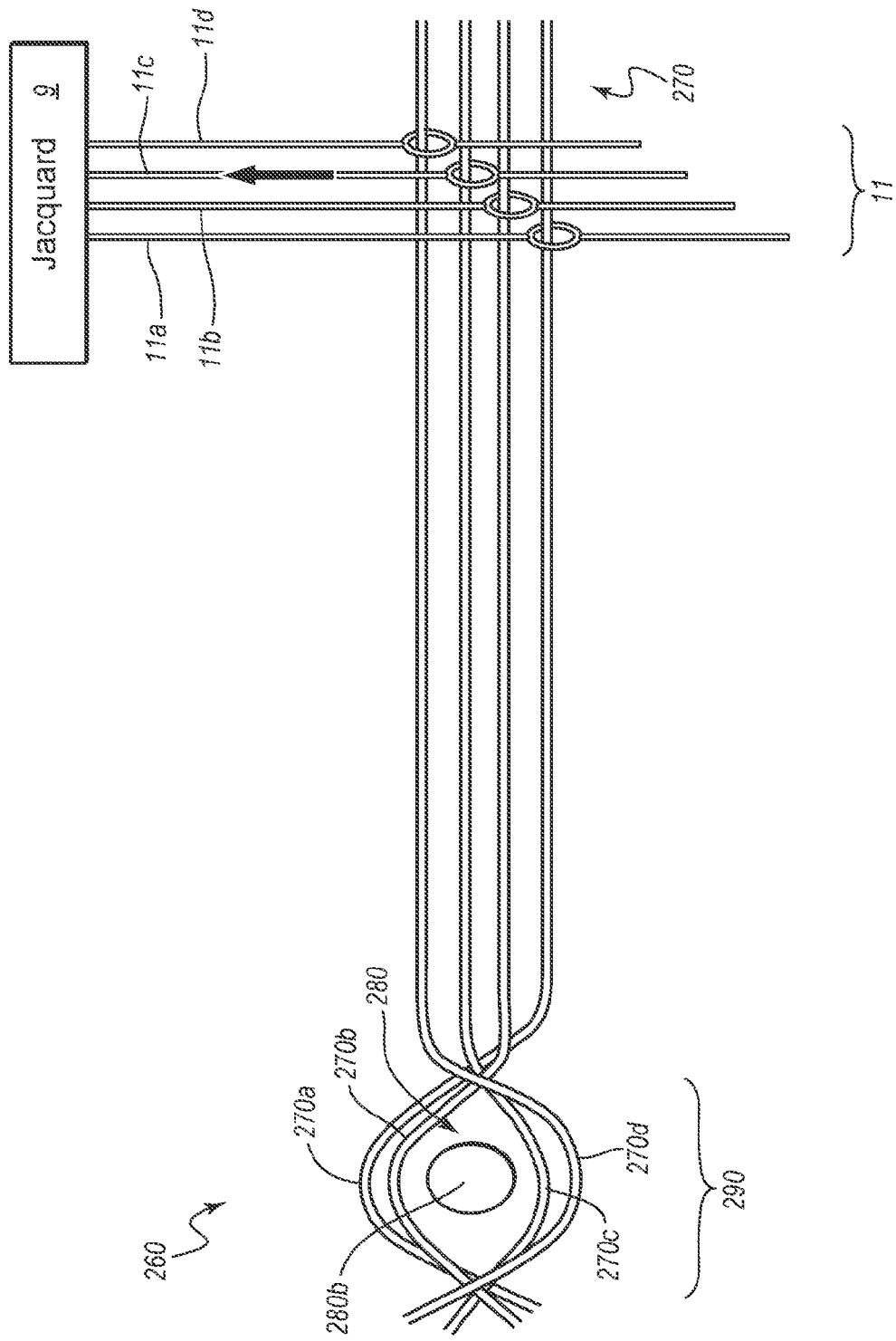
FIG. 4A is a side cross-section view of the Jacquard loom of FIG. 3 depicting four sets of alternating warp yarns interwoven with a first weft yarn formed in a noninflatable fabric portion.

FIGS. 4A-4F depict a more detailed set of steps that may be used in some embodiments of weaving an airbag fabric 260, each showing a cross-section view of a portion of Jacquard loom 9, depicting four sets 270a, 270b, 270c, 270d of alternating warp yarns 270 woven around weft yarns 280. FIG. 4A illustrates the four warp yarn sets 270a, 270b, 270c, 270d interwoven with weft yarn 280b formed in a non-inflatable fabric portion 290. This may provide a starting point before an inflatable fabric portion 295 is woven (see FIGS. 4B-4F). As depicted, first and second warp yarn sets 270a, 270b may be woven over an adjacent weft yarn 280b, and third and fourth warp yarn sets 270c, 270d may be woven under the adjacent weft yarn 280b. First, second, third, and fourth warp yarn sets 270a, 270b, 270c, 270d may be coupled to corresponding first, second, third, and fourth sets 11a, 11b, 11c, 11d of lifting bars 11 of Jacquard loom 9.

Figure 4B:
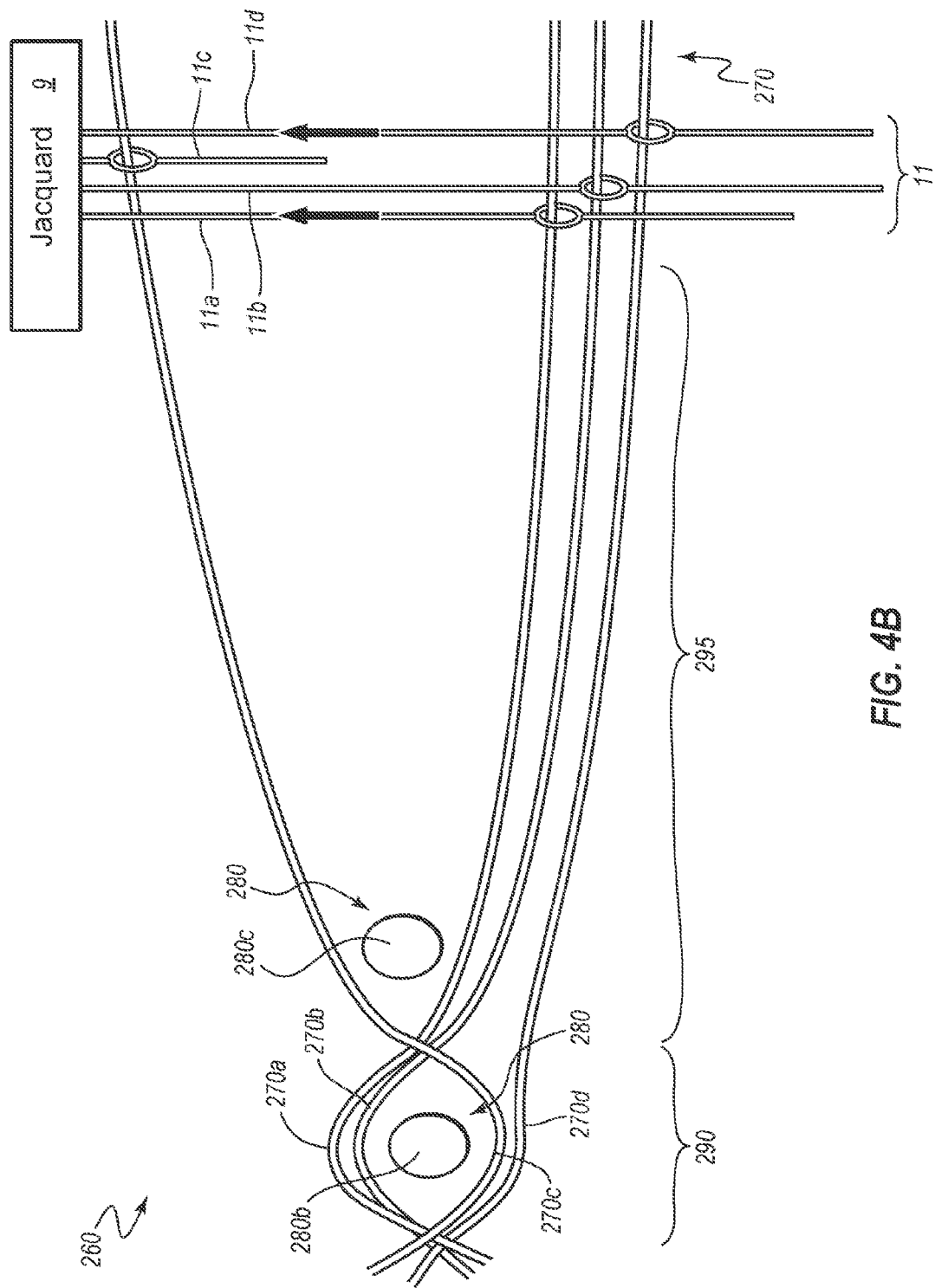
FIGS. 4B-4F are side cross-section views as in FIG. 4A, illustrating a series of steps of a process, according to one embodiment, to form two opposing layers including an aperture section of an airbag fabric.

FIG. 4B illustrates a first step of weaving an inflatable fabric portion 295 according to some embodiments. After the third set 11c of lifting bars is raised, a first adjacent weft yarn 280c can be inserted through the gap created between first and third warp yarn sets 270a, 270c. The arrows superimposed adjacent first and fourth sets 11a, 11d of lifting bars indicate that these are to be raised in the next step.

Figure 4C:
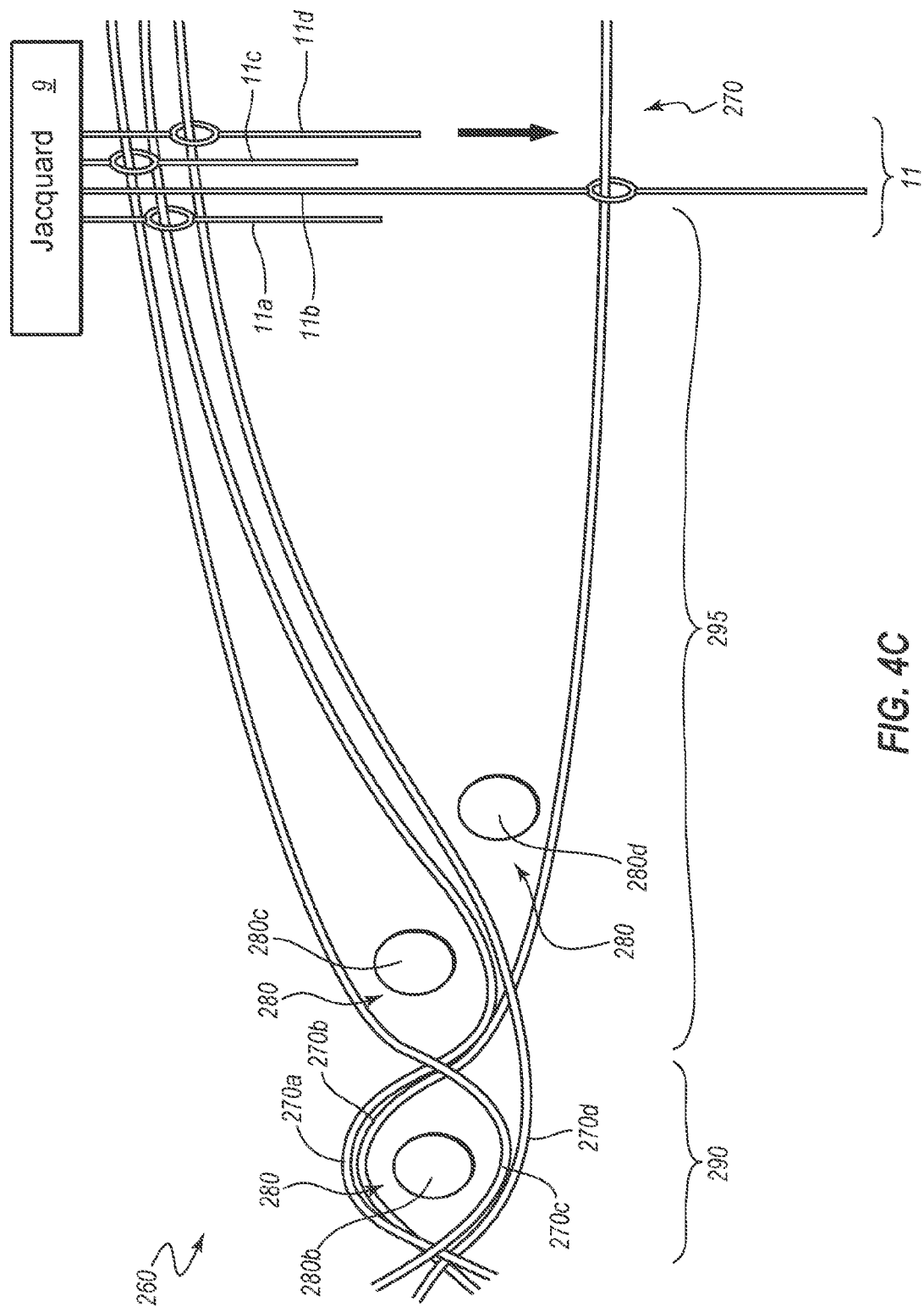

FIG. 4C illustrates the result of raising first and fourth sets 11a, 11d of lifting bars, creating another gap, this time between second and fourth warp yarn sets 270b, 270d, through which is inserted a second adjacent weft yarn 280d. The arrow superimposed adjacent the fourth set 11d of lifting bars indicates that these are to be dropped in the next step.

Figure 4D:
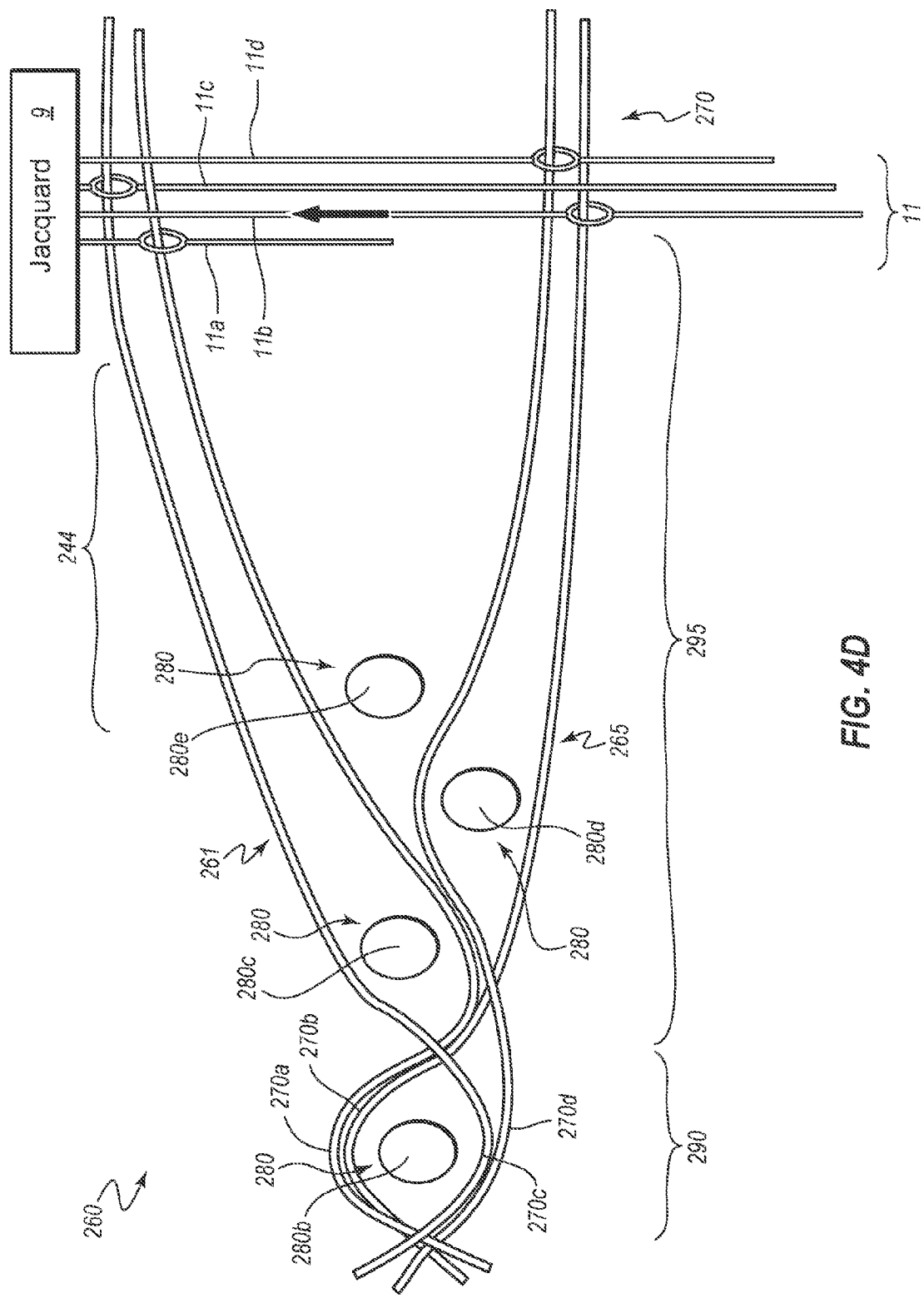

FIG. 4D illustrates the result of dropping the fourth set 11d of lifting bars, creating another gap between first and fourth warp yarns sets 270a, 270d, through which is inserted a third adjacent weft yarn 280e. The arrow superimposed adjacent the second set 11b of lifting bars indicates that these are to be raised in the next step.

Figure 4E:
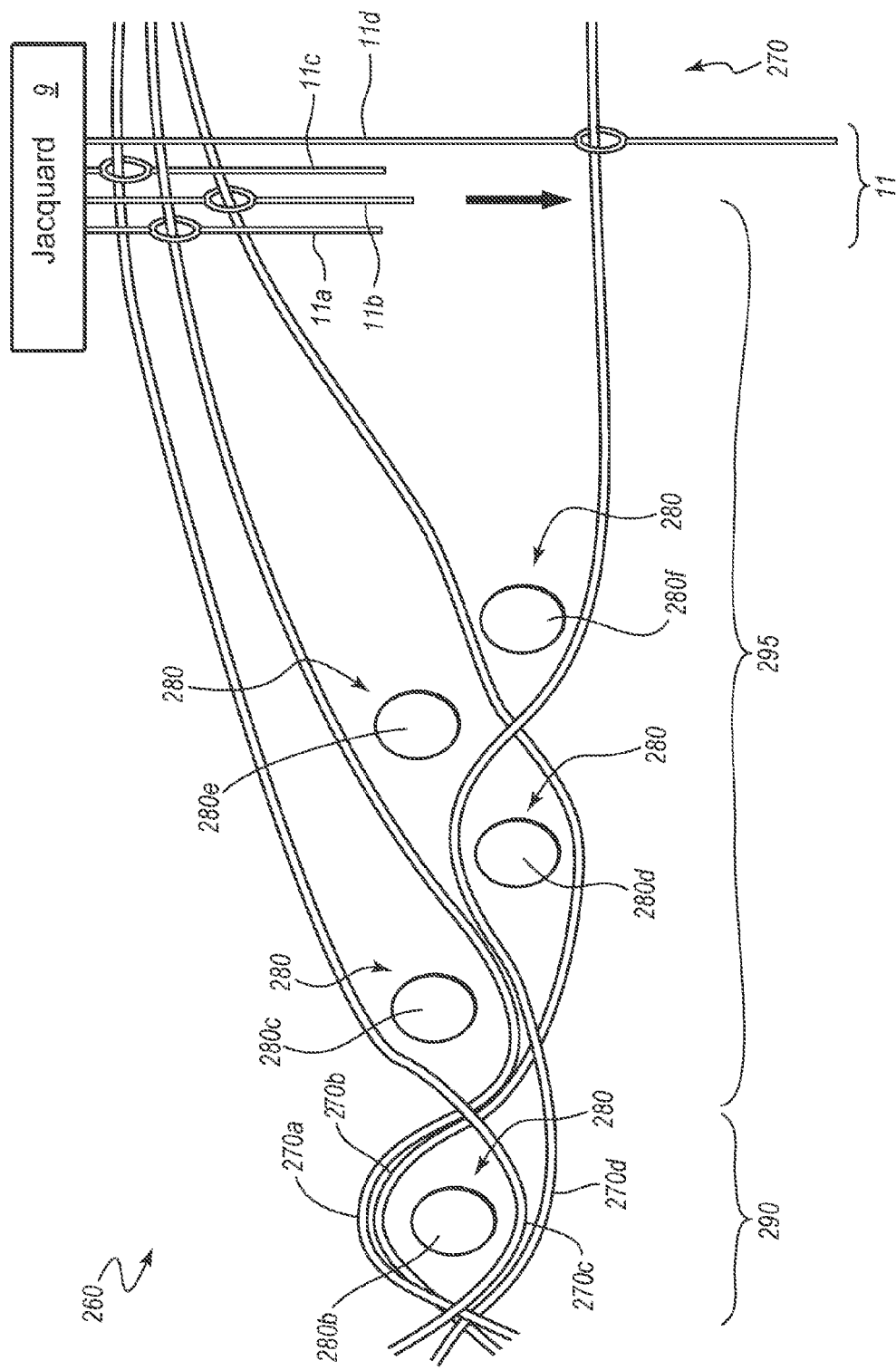

FIG. 4E illustrates the result of raising the second set 11b of lifting bars, creating another gap between second and fourth warp yarn sets 270b, 270d, through which is inserted a fourth adjacent weft yarn 280f. The arrow superimposed adjacent the second set 11b of lifting bars indicates that these are to be dropped in the next step.

Figure 4F:
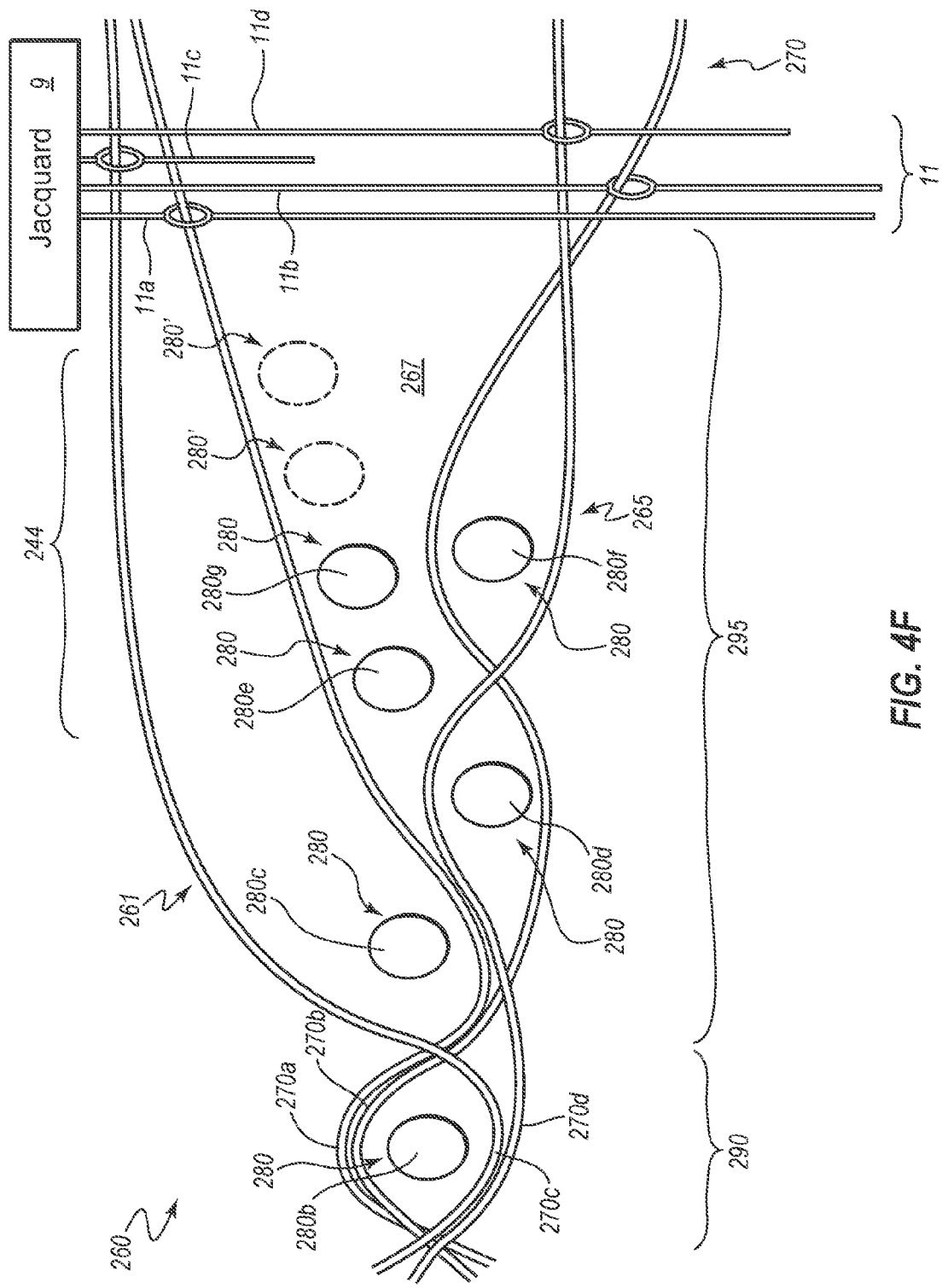

FIG. 4F illustrates the result of dropping the second set 11b of lifting bars. Furthermore, a fifth adjacent weft yarn 280g is inserted below first and third warp yarn sets 270a, 270c and above second and fourth warp yarn sets 270b, 270d. Additional adjacent weft yarns 280' may be inserted below first and third warp yarn sets 270a, 270c and above second and fourth warp yarn sets 270b, 270d to form an aperture section 244 of a predetermined size. Likewise, second and fourth warp yarn sets 270b, 270d can be woven around additional adjacent weft yarns to form a second woven fabric layer 265 of a predetermined size.

The exact assigned numbers of the respective warp yarn sets of first and second woven fabric layers 261, 265 are only exemplary for ease of explanation, and are not meant to provide limitations to the scope of this disclosure. Nevertheless, it should be apparent that first and second woven fabric layers 261, 265 are separated and opposing in relation, thereby forming an inflatable space 267 therebetween. The weaving process may continue to form an inflatable fabric portion 295 of a desired length, and through the pattern controlled by the computer, punch card, or other suitable mechanism, the Jacquard loom 9 may weave at least one contiguous non-inflatable fabric portion 290.

It should be noted that use of the OPW process enables the weaving of both an inflatable fabric portion 295 and a non-inflatable fabric portion 290 from the same sets of warp yarns 270a, 270b, 270c, 270d during a continuous weaving process. Note that each of the first and second woven fabric layers 261, 265 may be of varying lengths, if desired, to produce varying dimensions to parts of an inflatable airbag. This may still be accomplished through the same continuous weaving process by simply continuing to weave one of the first and second woven fabric layers 261, 265 while stopping for a time the weaving of the other of the first and second woven fabric layers 261, 265.

Figure 5:
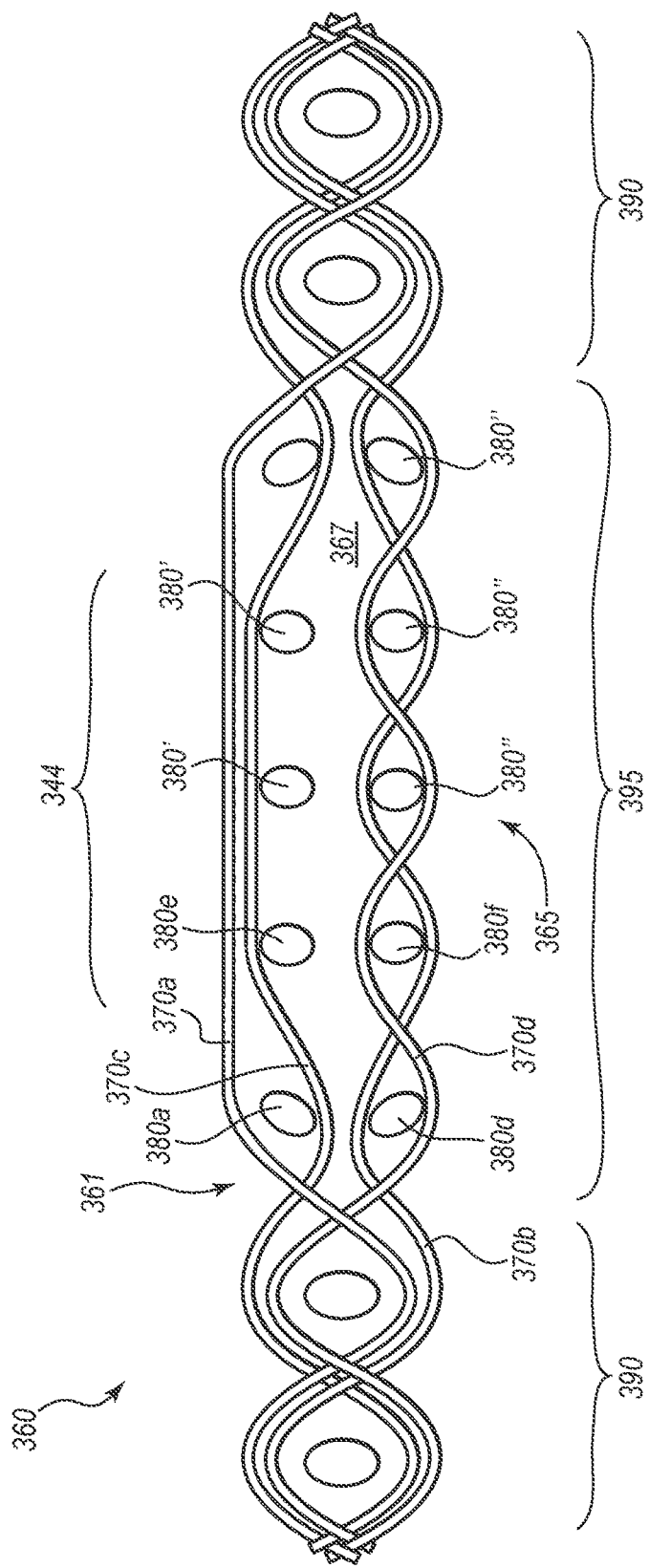
FIG. 5 is a side cross-section view of a woven airbag fabric according to another embodiment of the present disclosure.

One aspect of the present disclosure includes a method of weaving a fabric for an inflatable airbag. FIG. 5 is a side cross-section view of a woven airbag fabric 360 according to another embodiment of the present disclosure. In some embodiments, the method of weaving the fabric for the inflatable airbag may include forming the first woven fabric layer 361 via a first weaving pattern. The first weaving pattern may include weaving a first set of first yarns 370a over a first adjacent set of second yarns 380a and weaving a third set of first yarns 370c under the first adjacent set of second yarns 380a. The first weaving pattern may further include alternately weaving the first set of first yarns 370a under a second adjacent set of second yarns (not shown) and alternately weaving the third set of first yarns 370c over the second adjacent set of second yarns. Furthermore, the first weaving pattern may then include repeatedly weaving and alternately weaving the first set of first yarns 370a and the third set of first yarns 370c, substantially laterally, with respect to additional adjacent sets of second yarns.

In certain embodiments, the method of weaving the fabric for the inflatable airbag may include forming an aperture section 344 in a portion of the first woven fabric layer 361 via an aperture section weaving pattern. The aperture section weaving pattern may include weaving the first set of first yarns 370a over at least two adjacent sets of second yarns 380' and weaving the third set of first yarns 370c over at least two adjacent sets of second yarns 380'. In various embodiments, the method of weaving the fabric for the inflatable airbag may further include forming a second woven fabric layer 365. At least a portion of the first woven fabric layer 361 may be disposed opposite from and/or spaced apart from at least a portion of the second woven fabric layer 365. Additionally, each of the first woven fabric layer 361 and the second woven fabric layer 365 may define the inflatable fabric portion 367. In some embodiments, the inflatable fabric portion 367 may be surrounded, or at least partially surrounded, by a non-inflatable fabric portion 390.

In various embodiments, the method of weaving the fabric for the inflatable airbag may include forming the second woven fabric layer 365. The second woven fabric layer 365 may be formed via a second weaving pattern. In some embodiments, the second weaving pattern may include weaving a second set of first yarns 370b over a third adjacent set of second yarns 380d and weaving a fourth set of first yarns 370d under the third adjacent set of second yarns 380d. The second weaving pattern may further include alternately weaving the second set of first yarns 370b under a fourth adjacent set of second yarns 380f and alternately weaving the fourth set of first yarns 370d over the fourth adjacent set of second yarns 380f. The second weaving pattern may further include repeatedly weaving and alternately weaving the second set of first yarns 370b and the fourth set of first yarns 370d, substantially laterally, with respect to additional adjacent sets of second yarns 380". The repeatedly weaving and alternately weaving steps may be repeated a predetermined or suitable number of times.

In certain embodiments, the method of weaving the fabric for the inflatable airbag may further include removing a portion of the first yarns 370a, 370c and/or the second yarns 380' disposed in the aperture 344. For example, the first yarns 370a, 370c and/or the second yarns 380' disposed in the aperture 344 may be removed so that one or more components may be more easily disposed through the aperture 344 than through an aperture wherein first yarns and/or second yarns have not been removed. In another example, the first yarns 370a, 370c and/or the second yarns 380' disposed in the aperture 344 may be removed so that the inflation gas may flow through the aperture 344 more easily than through an aperture wherein first yarns and/or second yarns have not been removed.

In various embodiments, the first woven fabric layer 361 and the second woven fabric layer 365 may define at least one inflatable chamber 367 within an inflatable fabric portion 395. In some embodiments, the aperture 344 may define a vent in fluid communication with the at least one inflatable chamber 367.

In certain embodiments, each of the first woven fabric layer 361 and the second woven fabric layer 365 may be woven to form a single piece of fabric 360. In various embodiments, the first yarns may comprise warp yarns and the second yarns may comprise weft yarns. In various other embodiments, the first yarns may comprise weft yarns and the second yarns may comprise warp yarns.

Figure 6:
FIG. 6 is a perspective view of an inflatable airbag according to one embodiment of the present disclosure.

FIG. 6 illustrates an inflatable airbag 400 including a first panel of fabric or first woven fabric layer 461 that includes one or more aperture sections 444, 444', 444". In some embodiments, the first panel of fabric 461 may be formed from a first plurality of first yarns forming a first set of first yarns and a third set of first yarns, and a first plurality of second yarns oriented transverse, or substantially transverse, to the first plurality of first yarns. In certain embodiments, the first set of first yarns may be woven over a first adjacent set of second yarns while the third set of first yarns may be woven under the first adjacent set of second yarns. Additionally, the first set of first yarns may be woven under a second adjacent set of second yarns while the third set of first yarns may be woven over the second adjacent set of second yarns, forming a first panel weaving pattern. In various embodiments, the first panel weaving pattern may be repeated a predetermined or suitable number of times to form a portion of the first panel of fabric 461.

In some embodiments, the one or more aperture sections 444, 444', 444" may be formed by weaving the third set of first yarns over at least two adjacent sets of second yarns, and weaving the first set of first yarns over at least two adjacent sets of second yarns, forming an aperture section weaving pattern. In certain embodiments, the aperture section weaving pattern may form at least a portion of the one or more aperture sections 444, 444', 444". As illustrated, the inflatable airbag 400 can further comprise a second woven fabric layer or second panel of fabric 465. In various embodiments, the second panel of fabric 465 may be coupled to the first panel of fabric 461 to define an inflatable space or inflatable chamber 467 for receiving an inflation gas from an inflator (not shown). Furthermore, the first panel 461 may be a front panel and the second panel 465 may be a rear panel, or vice versa.

In some embodiments, the second panel of fabric 465 may be formed from a second plurality of first yarns forming a second set of first yarns and a fourth set of first yarns and a second plurality of second yarns oriented transverse, or substantially transverse, to the second plurality of first yarns. In certain embodiments, the second set of first yarns may be woven over a third adjacent set of second yarns while the fourth set of first yarns may be woven under the third adjacent set of second yarns. Additionally, the second set of first yarns may be woven under a fourth adjacent set of second yarns while the fourth set of first yarns may be woven over the fourth adjacent set of second yarns, forming a second panel weaving pattern. In various embodiments, the second panel weaving pattern may be repeated a predetermined or suitable number of times to form a portion or at least a portion of the second panel of fabric 465.

Each of the first panel of fabric 461 and the second panel of fabric 465 may be integrally formed by an OPW process. In some embodiments, the first yarns of the first panel of fabric 461 and/or the second panel of fabric 465 may include warp yarns, and the second yarns of the first panel of fabric 461 and/or the second panel of fabric 465 may comprise weft yarns. In some other embodiments, the first yarns of the first panel of fabric 461 and/or the second panel of fabric 465 may comprise weft yarns, and the second yarns of the first panel of fabric 461 and/or the second panel of fabric 465 may comprise warp yarns.

Figure 7:
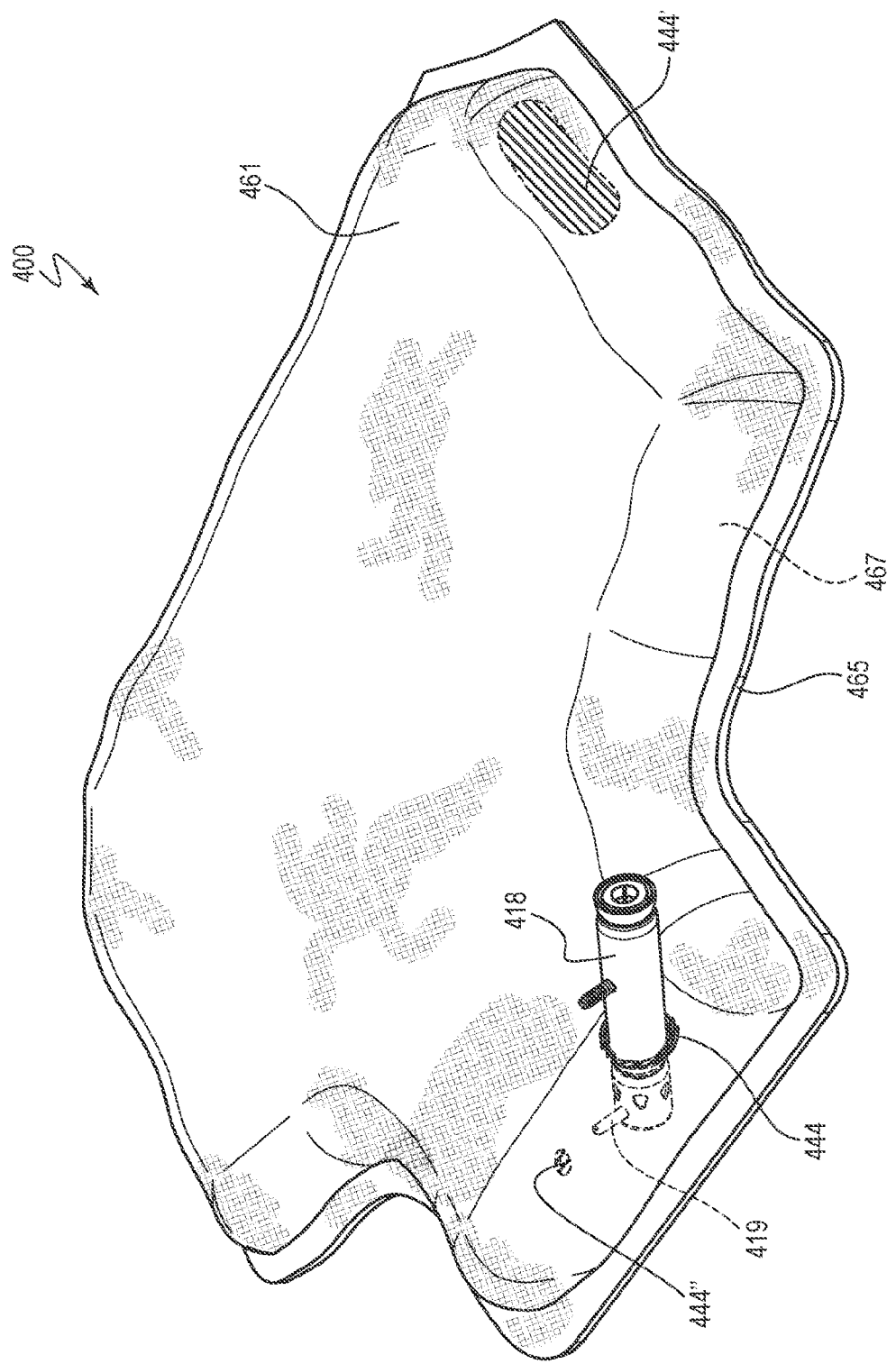
FIG. 7 is a perspective view of the inflatable airbag of FIG. 6, wherein an inflator is partially disposed within the inflatable airbag.

FIG. 7 is a perspective view of the inflatable airbag 400 of FIG. 5. As depicted, an inflator 418 is being disposed within at least a portion of the inflatable airbag 400 through at least a portion of the aperture or aperture section 444. In some embodiments, the one or more apertures 444, 444', 444" may be configured to receive at least a portion of a component. For example, the one or more apertures 444, 444'. 444" may be configured to receive at least a portion of at least one of the inflator 418, a lead wire (not shown), a mounting hardware component (e.g., an inflator stud 419), and/or another suitable component. In some embodiments, at least a portion of the first yarns and/or the second yarns that are disposed in the one or more apertures 444, 444', 444" may be substantially loose. As such, one or more components may be disposed through the one or more apertures 444, 444', 444". For example, the substantially loose first yarns and/or second yarns may be displaced such that the one or more components may be disposed through the one or more apertures 444, 444', 444".

In some embodiments, an aperture (e.g., aperture 444') may be configured to allow or permit an inflation gas to egress from the inflatable chamber 467. Stated another way, the aperture 444' may form a vent (e.g., an external vent).

The shapes of the inflatable airbag 400 and its various components, such as the aperture sections 444, 444', 444", that are depicted in FIGS. 6 and 7 are not necessarily limiting. These shapes may be altered, such as to accommodate differently shaped vehicles. The inflatable airbag 400 can include a contiguous piece of material manufactured using an OPW technique. For example, the first and second panels of fabric 461, 465 may be formed from a unitary piece of material.

Any methods disclosed herein include one or more steps or actions for performing the described methods. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112(f). It will be apparent to those having skill in the art that changes may be made to the details of the above-described embodiments without departing from the underlying principles of the invention. Embodiments of the invention in which an exclusive property or privilege is claimed are defined as follows.

What is claimed is:

1. A fabric panel for an inflatable airbag, comprising:
   a woven section comprising a plurality of first yarns and a plurality of second yarns oriented transverse to the plurality of first yarns, wherein the plurality of first yarns are interwoven with the plurality of second yarns to form the woven section; and
   an aperture section surrounded by the woven section, the aperture section comprising a first set of multiple adjacent yarns of the plurality of first yarns and a second set of multiple adjacent yarns of the plurality of second yarns, wherein at the aperture section the first set of multiple adjacent yarns extends over the second set of multiple adjacent yarns such that the second set of multiple adjacent yarns extends under the first set of multiple adjacent yarns, wherein a subset of the first and second sets of multiple adjacent yarns at the aperture section are removed from the aperture section.

2. The fabric panel of claim 1, wherein the first set of multiple adjacent yarns of the plurality of first yarns and the second set of multiple adjacent yarns of the plurality of second yarns are selected to form a predetermined shape of the aperture section.

3. The fabric panel of claim 1, wherein the woven section and the aperture section are integrally formed by a single weaving process.

4. The fabric panel of claim 1, wherein the first yarns comprise warp yarns and the second yarns comprise weft yarns.

5. The fabric panel of claim 1, wherein the first yarns comprise weft yarns and the second yarns comprise warp yarns.

6. An inflatable airbag, comprising:
   a first panel of fabric comprising an aperture section, the first panel of fabric formed from a first plurality of first yarns forming a first set of first yarns and a third set of first yarns, and a first plurality of second yarns oriented transverse to the first plurality of first yarns, wherein the first set of first yarns is woven over a first adjacent set of second yarns while the third set of first yarns is woven under the first adjacent set of second yarns, and the first set of first yarns is woven under a second adjacent set of second yarns while the third set of first yarns is woven over the second adjacent set of second yarns, forming a first panel weaving pattern, the first panel weaving pattern being repeated to form a portion of the first panel of fabric; and
   a second panel of fabric coupled to the first panel of fabric to define an inflatable chamber for receiving inflation gas from an inflator,
   the aperture section formed by weaving the third set of first yarns over at least two adjacent sets of second yarns, and weaving the first set of first yarns over at least two adjacent sets of second yarns, forming an aperture section weaving pattern, the aperture section weaving pattern forming a portion of the aperture section, wherein a subset of the first or second yarns at the aperture section are removed from the aperture section, and wherein the aperture section allows for access through the first panel of fabric into the inflatable chamber.

7. The inflatable airbag of claim 6, wherein the second panel of fabric is formed from a second plurality of first yarns forming a second set of first yarns and a fourth set of first yarns, and a second plurality of second yarns oriented transverse to the second plurality of first yarns, wherein the second set of first yarns is woven over a third adjacent set of second yarns while the fourth set of first yarns is woven under the third adjacent set of second yarns, and the second set of first yarns is woven under a fourth adjacent set of second yarns while the fourth set of first yarns is woven over the fourth adjacent set of second yarns, forming a second panel weaving pattern, the second panel weaving pattern being repeated to form a portion of the second panel of fabric.

8. The inflatable airbag of claim 6, wherein the first panel of fabric and the second panel of fabric are integrally formed by a one-piece weaving process.

9. The inflatable airbag of claim 6, wherein the first yarns comprise warp yarns and the second yarns comprise weft yarns.

10. The inflatable airbag of claim 6, wherein the first yarns comprise weft yarns and the second yarns comprise warp yarns.

11. The inflatable airbag of claim 6, wherein the aperture section is configured to receive a portion of at least one of the inflator, a lead wire, or a mounting hardware component through the first panel of fabric into the inflatable chamber.

12. The inflatable airbag of claim 6, wherein the aperture section is configured to permit the inflation gas to egress from the inflatable chamber through the first panel of fabric.

13. The inflatable airbag of claim 12, wherein the aperture section forms an external vent.

14. The inflatable airbag of claim 6, wherein a subset of the first yarns and the second yarns disposed in the aperture section are substantially loose.

15. The inflatable airbag of claim 6, wherein the first panel is a front panel and the second panel is a rear panel.

16. A method of weaving a fabric for an inflatable airbag, comprising:
   forming a first woven fabric layer via a first weaving pattern comprising weaving a first set of first yarns over a first adjacent set of second yarns, weaving a third set of first yarns under the first adjacent set of second yarns, alternately weaving the first set of first yarns under a second adjacent set of second yarns and alternately weaving the third set of first yarns over the second adjacent set of second yarns, and then repeatedly weaving and alternately weaving the first set of first yarns and the third set of first yarns, substantially laterally, with respect to additional adjacent sets of second yarns;
   forming an aperture section in a portion of the first woven fabric layer via an aperture section weaving pattern comprising weaving the first set of first yarns over at least two adjacent sets of second yarns and weaving the third set of first yarns over at least two adjacent sets of second yarns;

forming a second woven fabric layer, wherein a portion of the first woven fabric layer is opposite from and spaced apart from a portion of the second woven fabric layer, and wherein the first woven fabric layer and the second woven fabric layer define an inflatable fabric portion that is surrounded by a non-inflatable fabric portion; and removing a subset of the first yarns and the second yarns disposed in the aperture section.

17. The method of claim 16, wherein the second woven fabric layer is formed via a second weaving pattern comprising weaving a second set of first yarns over a third adjacent set of second yarns, weaving a fourth set of first yarns under the third adjacent set of second yarns, alternately weaving the second set of first yarns under a fourth adjacent set of second yarns and alternately weaving the fourth set of first yarns over the fourth adjacent set of second yarns, and then repeatedly weaving and alternately weaving the second set of first yarns and the fourth set of first yarns, substantially laterally, with respect to additional adjacent sets of second yarns.

18. The method of claim 16, wherein the first woven fabric layer and the second woven fabric layer define at least one inflatable chamber within the inflatable fabric portion and wherein the aperture section defines a vent in fluid communication with the at least one inflatable chamber.

19. The method of claim 16, wherein the first woven fabric layer and the second woven fabric layer are woven to form a single piece of fabric.

20. The method of claim 16, wherein the first yarns comprise warp yarns and the second yarns comprise weft yarns.

21. The method of claim 16, wherein the first yarns comprise weft yarns and the second yarns comprise warp yarns.

* * * * *